US009672172B2

(12) United States Patent
Kanamori

(10) Patent No.: US 9,672,172 B2
(45) Date of Patent: Jun. 6, 2017

(54) INFORMATION PROCESSING APPARATUS, INFORMATION PROCESSING METHOD THEREOF, AND COMPUTER-READABLE STORAGE MEDIUM

(71) Applicant: CANON KABUSHIKI KAISHA, Tokyo (JP)

(72) Inventor: Hideyuki Kanamori, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 364 days.

(21) Appl. No.: 14/454,133

(22) Filed: Aug. 7, 2014

(65) Prior Publication Data
US 2015/0067218 A1 Mar. 5, 2015

(30) Foreign Application Priority Data
Sep. 2, 2013 (JP) .................................. 2013-181560

(51) Int. Cl.
G06F 13/24 (2006.01)
(52) U.S. Cl.
CPC .................................... G06F 13/24 (2013.01)
(58) Field of Classification Search
CPC ............. G06F 13/24; G06F 2213/2402; G06F 2213/2412
USPC ....................................... 710/260–269; 726/4
See application file for complete search history.

(56) References Cited

U.S. PATENT DOCUMENTS

2009/0106836 A1* 4/2009 Toshima ............... G06F 21/552
726/22
2009/0193504 A1* 7/2009 Kobayashi ............ G06F 21/608
726/4

FOREIGN PATENT DOCUMENTS

JP 2002-032604 A 1/2002

* cited by examiner

Primary Examiner — Tim T Vo
Assistant Examiner — Kim T. Huynh
(74) Attorney, Agent, or Firm — Fitzpatrick, Cella, Harper & Scinto

(57) ABSTRACT

A series of processing that includes a first control step for controlling an apparatus that executes predetermined processing and a second control step for controlling the apparatus based on a control result of the first control step is executed. An execution history of the first control step or the second control step is stored in a memory. The series of processing is interrupted in a case where a predetermined interruption factor occurs during execution of the series of processing. In a case where the interruption is executed, a start step for resuming the series of processing is set to the first control step or the second control step, based on the execution history stored in the memory.

9 Claims, 18 Drawing Sheets

| | Key | Value |
|---|---|---|
| ADJUSTMENT DATE | Date | 2010/10/13 |
| PRINTED PAGE NUMBER | Page Printed | 2 |
| SET PAGE NUMBER | Page Set | 1 |
| BLACK INK ADJUSTMENT INPUT VALUE FOR 1ST PAGE | P1 Black | 1 |
| CYAN INK ADJUSTMENT INPUT VALUE FOR 1ST PAGE | P1 Cyan | 0 |
| MAGENTA INK ADJUSTMENT INPUT VALUE FOR 1ST PAGE | P1 Magenta | 0 |
| YELLOW INK ADJUSTMENT INPUT VALUE FOR 1ST PAGE | P1 Yellow | -1 |
| BLACK INK ADJUSTMENT INPUT VALUE FOR 2ND PAGE | P2 Black | 0 |
| CYAN INK ADJUSTMENT INPUT VALUE FOR 2ND PAGE | P2 Cyan | 1 |
| MAGENTA INK ADJUSTMENT INPUT VALUE FOR 2ND PAGE | P2 Magenta | 0 |
| YELLOW INK ADJUSTMENT INPUT VALUE FOR 2ND PAGE | P2 Yellow | -1 |
| BLACK INK ADJUSTMENT INPUT VALUE FOR 3RD PAGE | P3 Black | 0 |
| CYAN INK ADJUSTMENT INPUT VALUE FOR 3RD PAGE | P3 Cyan | 0 |
| MAGENTA INK ADJUSTMENT INPUT VALUE FOR 3RD PAGE | P3 Magenta | 1 |
| YELLOW INK ADJUSTMENT INPUT VALUE FOR 3RD PAGE | P3 Yellow | 0 |

F I G. 2B

17

| Key | Value |
|---|---|
| Head Status | NOT REINSTALLED |
| P1 Black | 1 |
| P1 Cyan | 0 |
| P1 Magenta | 0 |
| P1 Yellow | -1 |
| P2 Black | 0 |
| P2 Cyan | 1 |
| P2 Magenta | 0 |
| P2 Yellow | -1 |
| P3 Black | 0 |
| P3 Cyan | 0 |
| P3 Magenta | 1 |
| P3 Yellow | 0 |

| HEAD REINSTALLATION STATUS |
| BLACK INK ADJUSTMENT INPUT VALUE FOR 1ST PAGE |
| CYAN INK ADJUSTMENT INPUT VALUE FOR 1ST PAGE |
| MAGENTA INK ADJUSTMENT INPUT VALUE FOR 1ST PAGE |
| YELLOW INK ADJUSTMENT INPUT VALUE FOR 1ST PAGE |
| BLACK INK ADJUSTMENT INPUT VALUE FOR 2ND PAGE |
| CYAN INK ADJUSTMENT INPUT VALUE FOR 2ND PAGE |
| MAGENTA INK ADJUSTMENT INPUT VALUE FOR 2ND PAGE |
| YELLOW INK ADJUSTMENT INPUT VALUE FOR 2ND PAGE |
| BLACK INK ADJUSTMENT INPUT VALUE FOR 3RD PAGE |
| CYAN INK ADJUSTMENT INPUT VALUE FOR 3RD PAGE |
| MAGENTA INK ADJUSTMENT INPUT VALUE FOR 3RD PAGE |
| YELLOW INK ADJUSTMENT INPUT VALUE FOR 3RD PAGE |

FIG. 5A

PRINT FIRST PAGE OF ADJUSTMENT PATTERNS.

PRINT SECOND PAGE OF ADJUSTMENT PATTERNS.

PRINT THIRD PAGE OF ADJUSTMENT PATTERNS ?

INPUT ADJUSTMENT VALUES FOR FIRST PAGE OF ADJUSTMENT PATTERNS

| BLACK | +1 |
| CYAN | 0 |
| MAGENTA | 0 |
| YELLOW | -1 |

SET 51, 52, 53, 54, 55

INPUT ADJUSTMENT VALUES FOR SECOND PAGE OF ADJUSTMENT PATTERNS

| BLACK | 0 |
| CYAN | +1 |
| MAGENTA | 0 |
| YELLOW | -1 |

SET

INPUT ADJUSTMENT VALUES FOR THIRD PAGE OF ADJUSTMENT PATTERNS

| BLACK | 0 |
| CYAN | 0 |
| MAGENTA | +1 |
| YELLOW | 0 |

SET

80 — ADJUSTMENT PATTERNS 2

| | −1 | 0 | +1 |
|---|---|---|---|
| 81 — BLACK | ||| ||| | ||| ||| | ||| ||| |
| 82 — CYAN | ||| ||| | ||| ||| | ||| ||| |
| 83 — MAGENTA | ||| ||| | ||| ||| | ||| ||| |
| 84 — YELLOW | ||| ||| | ||| ||| | ||| ||| |

FIG. 9

90 — ADJUSTMENT PATTERNS 3

| | −1 | 0 | +1 |
|---|---|---|---|
| 91 — BLACK | = = | = = | = = |
| 92 — CYAN | = = | = = | = = |
| 93 — MAGENTA | = = | = = | = = |
| 94 — YELLOW | = = | = = | = = |

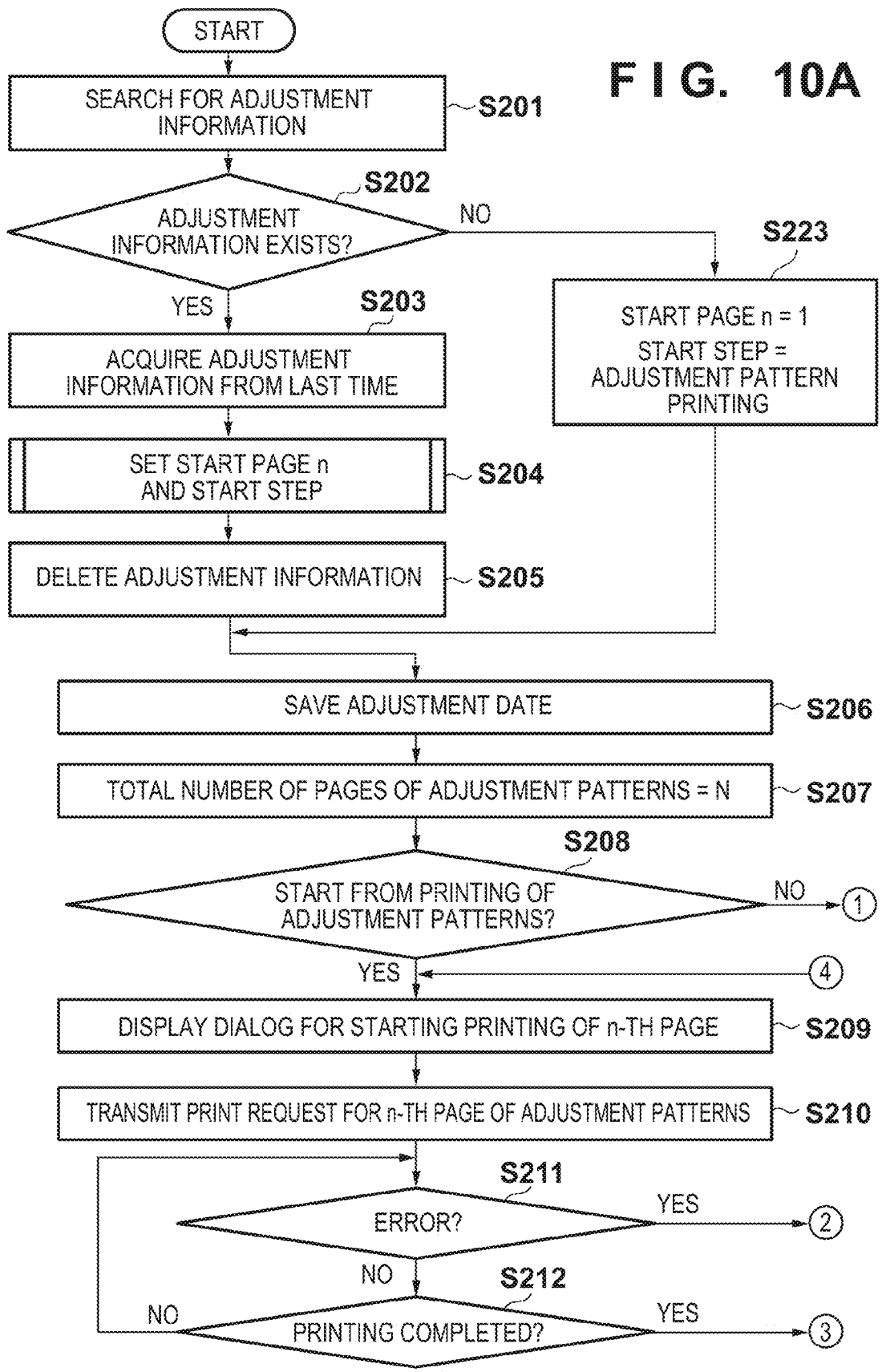
F I G. 10A

F I G. 12A
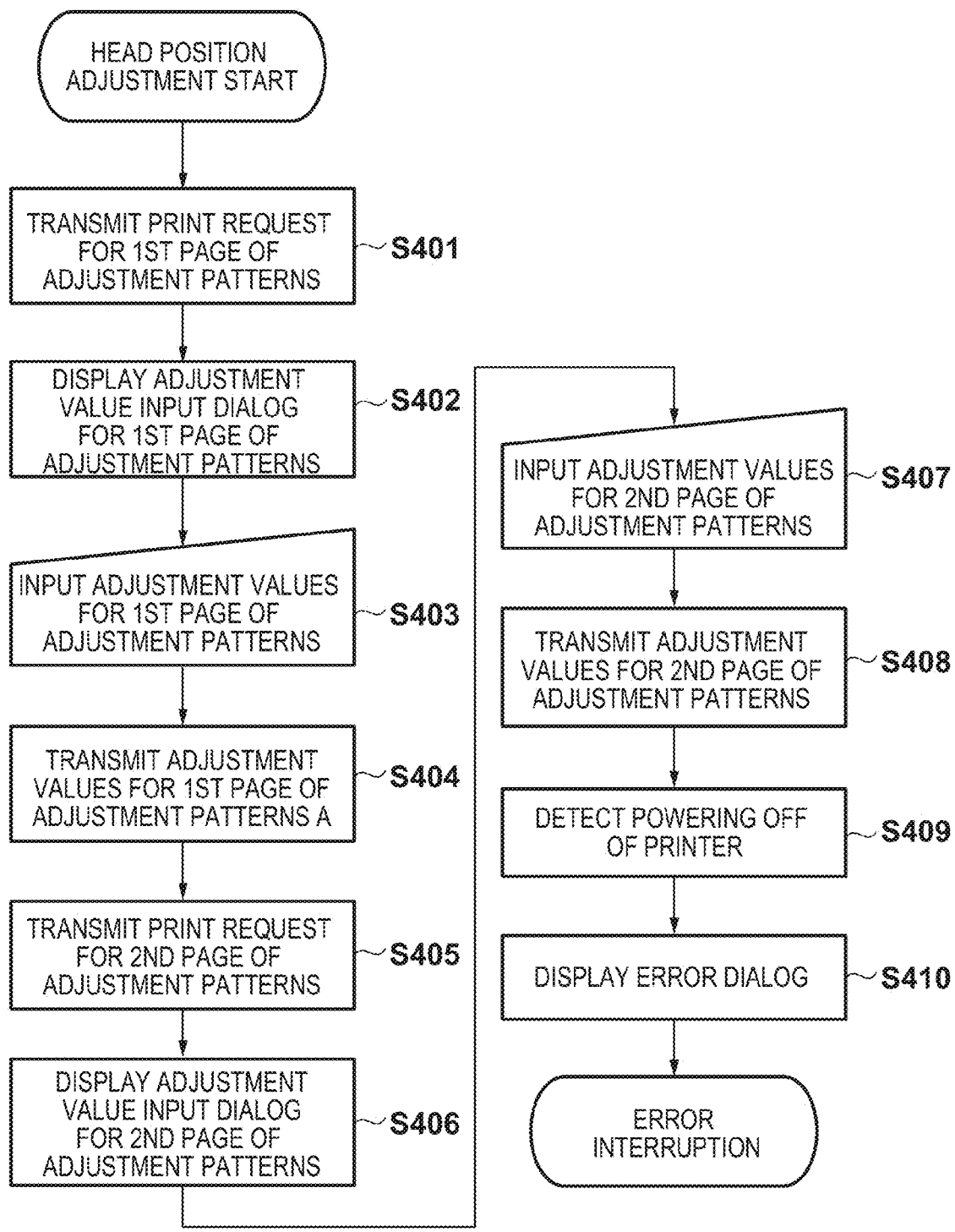

FIG. 13

```
HEAD POSITION ADJUSTMENT HAS BEEN
INTERRUPTED DUE TO A PRINTER ERROR.

```
THE LAST HEAD POSITION ADJUSTMENT WAS INTERRUPTED.
PLEASE SELECT THE START STEP.

● START FROM PRINTING OF SECOND PAGE OF
    ADJUSTMENT PATTERNS.
  ○ START FROM THE BEGINNING.

```
THE LAST HEAD POSITION ADJUSTMENT WAS INTERRUPTED.
PLEASE SELECT THE START STEP.

● START FROM INPUT OF ADJUSTMENT VALUES
    FOR SECOND PAGE OF ADJUSTMENT PATTERNS.
  ○ START FROM PRINTING OF
    SECOND PAGE OF ADJUSTMENT PATTERNS.
  ○ START FROM THE BEGINNING.

OK
```
140
142
141

INFORMATION PROCESSING APPARATUS, INFORMATION PROCESSING METHOD THEREOF, AND COMPUTER-READABLE STORAGE MEDIUM

BACKGROUND OF THE INVENTION

Field of the Invention

The present invention relates to technology for resuming processing in the case where a series of processing that includes a plurality of steps is interrupted.

Description of the Related Art

Conventionally, there is technology that has a function of resuming processing from where the processing was interrupted, in the case where a printing system interrupts processing that is being executed partway through (see Japanese Patent Laid-Open No. 2002-32604). For example, the page number at which the printing was interrupted is saved as interruption information when printing is interrupted partway through, and, at the time of resumption, the printing is resumed from the page at which the printing was interrupted based on the interruption information. However, with a series of processing that is constituted by a plurality of mutually related steps, the printing may need to be resumed not from the interrupted step but from a few steps before the interrupted step.

For example, inkjet printers print by discharging ink droplets from a plurality of nozzles arrayed in a print head and adhering the ink droplets to a sheet. However, there is a problem in that printing quality drops due to shift in the adhesion position of the ink droplets caused by factors such as error in the attachment position of the print head. In order to avoid this problem, common inkjet printers are provided with an adjustment function for correcting shift in the adhesion position of ink droplets.

With this adjustment function, shift in the adhesion position of ink droplets is corrected by a printing step for printing various types of adjustment patterns and a setting step for setting adjustment values with reference to the printed adjustment patterns being repeated a plurality of times. Here, in the case where processing is interrupted during an intermediate setting step, it is desirable to be able to select whether to resume from the interrupted setting step or from the printing step before the setting step according to the state of the adjustment patterns referred to in the setting step.

Resuming from the printing step before the setting step is appropriate in the case where there is a problem with the printing result of the adjustment patterns or the printed adjustment patterns have been lost, and resuming from the setting step is appropriate in other cases. However, with the conventional resumption method, processing could only be resumed from the interrupted step, and thus it was not always possible to resume processing at the appropriate step.

SUMMARY OF THE INVENTION

The present invention provides an information processing apparatus and an information processing method that enable processing to be resumed from an appropriate step when a series of processing that includes a plurality of steps is interrupted, and a computer-readable storage medium.

An information processing apparatus according to the present invention for attaining the above object is provided with the following configuration. That is, an execution unit configured to execute a series of processing that includes a first control step for controlling an apparatus that executes predetermined processing and a second control step for controlling the apparatus based on a control result of the first control step; a storage control unit configured to store an execution history of the first control step or the second control step in a memory; an interruption unit configured to interrupt the series of processing in a case where a predetermined interruption factor occurs during the execution of the series of processing by the execution unit; and a setting unit configured to set, in a case where the interruption is executed by the interruption unit, a start step for resuming the series of processing that is executed by the execution unit to the first control step or the second control step, based on the execution history stored in the memory by the storage control unit.

According to the present invention, processing can be resumed from an appropriate step, when a series of processing that includes a plurality of steps is interrupted.

Further features of the present invention will become apparent from the following description of exemplary embodiments with reference to the attached drawings.

BRIEF DESCRIPTION OF THE DRAWINGS

FIG. 2A is a diagram showing a data configuration of an adjustment information storage portion.

FIG. 2B is a diagram showing a data configuration of a setting information storage portion.

FIG. 5A is a diagram showing a printing start dialog that is displayed when starting printing of adjustment patterns.

FIG. 5B is a diagram showing a printing start dialog that is displayed when starting printing of adjustment patterns.

FIG. 5C is a diagram showing a printing start dialog that is displayed when starting printing of adjustment patterns.

FIG. 7A is a diagram showing an adjustment value input dialog for inputting adjustment values with respect to adjustment patterns.

FIG. 7B is a diagram showing an adjustment value input dialog for inputting adjustment values with respect to adjustment patterns.

FIG. 7C is a diagram showing an adjustment value input dialog for inputting adjustment values with respect to adjustment patterns.

FIG. 8 is a diagram showing the printing result of a second page of adjustment patterns.

FIG. 9 is a diagram showing the printing result of a third page of adjustment patterns.

FIG. 10A is a flowchart showing details of processing for head position adjustment.

FIG. 12A is a flowchart showing exemplary interruption and resume processing at the time of head position adjustment.

FIG. 13 is a diagram showing an error dialog that is displayed when an error occurs.

FIG. 14A is a diagram showing a selection dialog for selecting a start step after processing has been interrupted.

FIG. 14B is a diagram showing a selection dialog for selecting a start step after processing has been interrupted.

DESCRIPTION OF THE EMBODIMENTS

Hereinafter, embodiments of the present invention will be described in detail, with reference to the accompanying drawings. Note that the following embodiments are not intended to limit the scope of the invention as defined in the claims, and not all combinations of the features described in the embodiments are essential to means for solving the problems addressed by the invention.

Embodiment 1

The configuration of a printing system of Embodiment 1 will be described with reference to the block diagram of FIG. 1.

Figure 1:
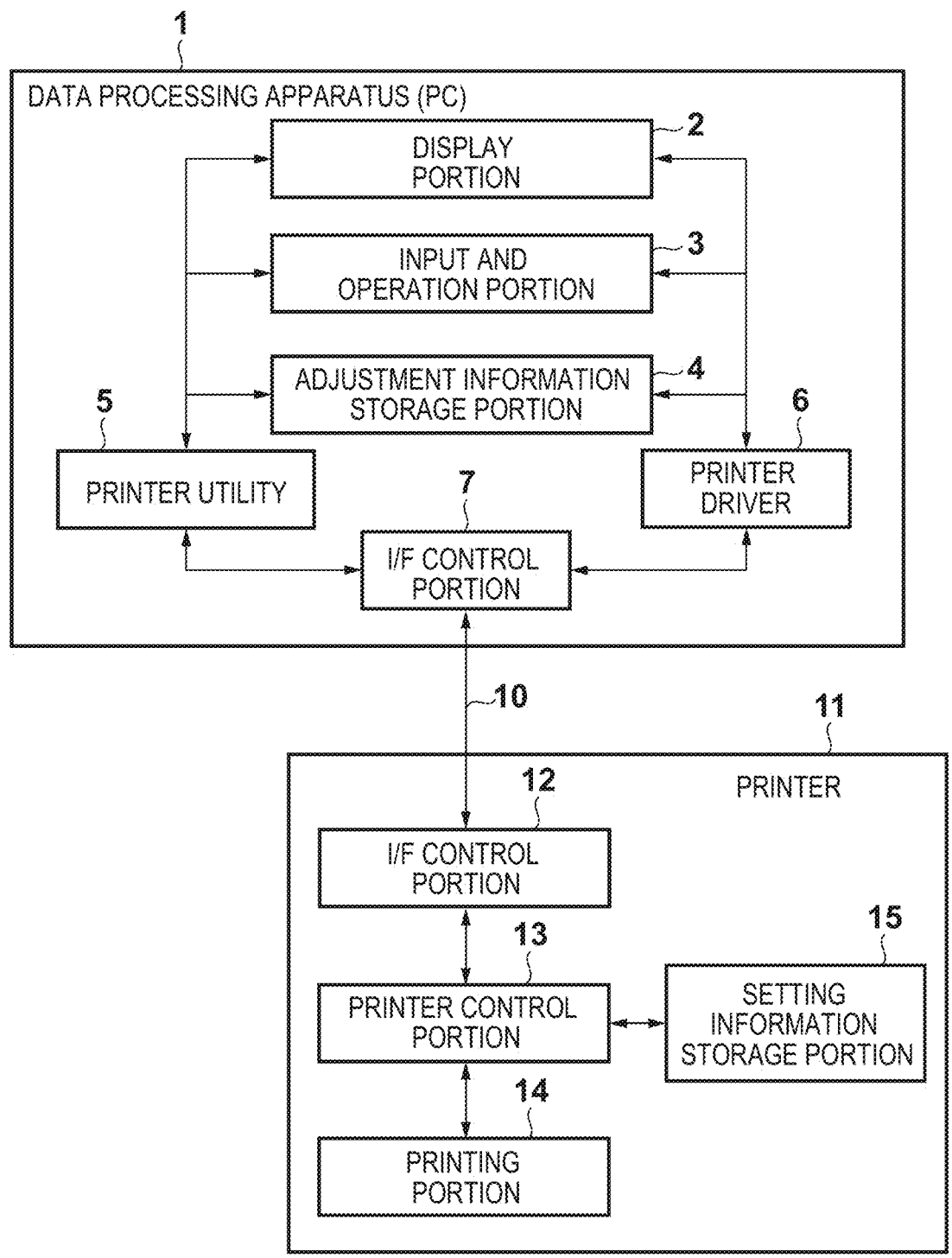
FIG. 1 is a diagram showing a configuration of a printing system.

In FIG. 1, a data processing apparatus 1 controls a printer 11 (printing apparatus that prints onto recording media). Here, the data processing apparatus 1 is a personal computer (hereinafter, PC), and executes various processing on an operating system (hereinafter, OS). Although the OS is not illustrated in FIG. 1, the resources of the PC 1, such as the various blocks within the PC 1, for example, are managed by the OS.

Here, the PC 1 has a hardware configuration with which a common information processing apparatus is provided. Specifically, the PC 1 is provided with a so-called CPU, ROM, hard disk, RAM, and various device controllers. The CPU executes programs of the OS, applications or the like stored in a program ROM of the ROM or loaded from the hard disk to the RAM. The RAM also functions as a main memory, work area and the like of the CPU.

The PC 1 is also provided with an input and operation portion such as a keyboard or a mouse, a display portion such as a CRT or an LCD, and a disk controller (DKC) that controls data access to an information storage portion such as the hard disk (HD) or a flexible disk (FD). The PC 1 is also provided with an I/F (interface) control portion that controls exchange of data between the PC 1 and the printer 11 connected to the PC 1. The programs that are executed by the CPU enable acquisition of input values from the input and operation portion and various display on the display portion. The CPU is also capable of transmission and reception of data with the information storage portion or the connected printer.

The PC 1 is constituted by a display portion 2, an input and operation portion 3, an adjustment information storage portion 4, a printer utility 5, a printer driver 6, and an I/F (interface) control portion 7. A communication interface 10 connects the PC 1 and the printer 11. In Embodiment 1, the communication interface 10 is assumed to be a USB (Universal Serial Bus), which is a local interface, but is not limited thereto. For example, various types of wired communication (IEEE 1394, serial bus, etc.)/wireless communication (WLAN, Bluetooth, NFC, etc.) can be utilized.

The printer utility 5 is an application that is provided with a function (hereinafter, head position adjustment) for correcting adhesion position shift of ink droplets due to error in the attachment position of the print head or the like. The printer utility 5 displays various dialogs discussed later on the display portion 2, and executes head position adjustment in accordance with operations performed by the user on the input and operation portion 3. When the user executes head position adjustment with the printer utility 5, the printer utility 5 generates a command for controlling printing of adjustment patterns of the head position and a command for setting adjustment values, and transmits the commands to the printer 11 through the I/F control portion 7. Also, the printer utility 5 saves execution results and adjustment values of the head position adjustment function to the adjustment information storage portion 4 as an execution history (memory control).

The adjustment information storage portion 4 has a data configuration shown in Table 16 of FIG. 2A. Each set of data is constituted by a key (Key) for accessing specific information and a value (Value) that stores information. A unique key is allocated to each piece of information that is stored, and required information can be acquired by referring to the values based on the keys. The date on which head position adjustment was performed is saved in Adjustment Date. The printed page number of adjustment patterns is saved in Printed Page Number, and the information is updated when the printer utility 5 detects that the printing of each page of adjustment patterns has been completed. The page number of set adjustment values is saved in Set Page Number, and information is updated when the printer utility 5 detects that the setting of adjustment values for each page has been completed. Values input by the user during the adjustment of each page are saved in the adjustment input values for black ink, cyan ink, magenta ink and yellow ink of the first to third pages.

The printer driver 6, upon receiving various print data from the OS, converts the received print data to output data, and transmits the output data to the printer 11 through the I/F control portion 7. Also, the printer driver 6, at the start of printing, generates a setting command for setting adjustment values of the head position before transmission of the output data if necessary, and transmits the setting command to the printer 11 through the I/F control portion 7.

The printer 11 is constituted by an I/F (interface) control portion 12, a printer control portion 13, a printing portion 14, and a setting information storage portion 15. In Embodiment 1, the printer 11 is assumed to be a color inkjet printer that is equipped with black ink, cyan ink, magenta ink and yellow ink as recording agents. It should be obvious that the printer 11 may be a color inkjet printer/monochrome printer that is equipped with recording agents of other colors besides the above colors.

The printer 11, upon receiving various commands through the I/F control portion 12, performs operations according to the received commands. Upon receiving a control command that instructs printing of adjustment patterns, the printer control portion 13 controls the printing portion 14 based on the control command, and prints adjustment patterns of the head position. Also, the printer control portion 13, upon receiving adjustment values of the head position, saves the adjustment values to the setting information storage portion 15.

The setting information storage portion 15 has a data configuration shown in Table 17 of FIG. 2B. Each set of data is constituted by a key for accessing specific information and a value that stores information. A unique key is allocated to each piece of information that is stored, and required information can be acquired by referring to the values based on the keys. Information indicating whether the print head has been removed and installed again after setting of head position adjustment is saved in Head Reinstallation Status.

For example, a flag showing whether the print head has been reinstalled is saved to the setting information storage portion 15 as the above information. Also, the CPU of the printer 11 is able to determine whether the print head is installed by determining whether the print head is in an energized state. The CPU of the printer 11 sets the above flag to "1" if it is determined that the print head has been removed and installed again after head position adjustment. In the case where head position adjustment is then executed again, the above flag is set to "0". Therefore, in the case where the above flag is "1", it can be determined that the head has been reinstalled after the last head position adjustment.

Figure 3:
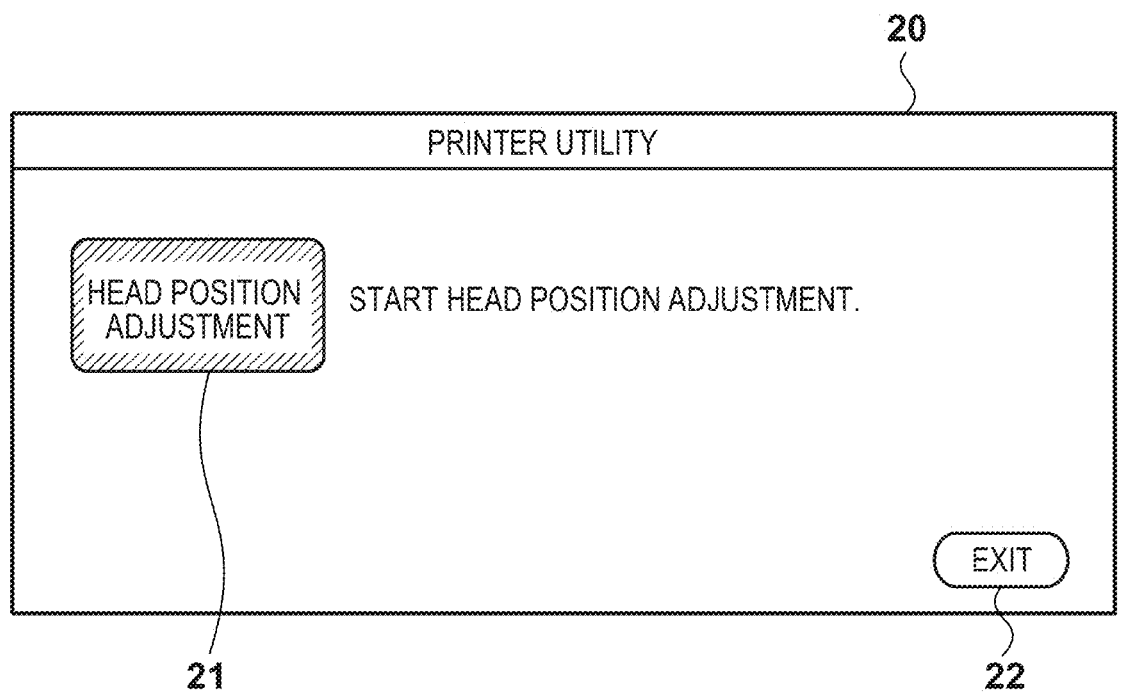
FIG. 3 is a diagram showing an operation dialog of a printer utility.

FIG. 3 is a diagram showing an operation dialog of the printer utility 5.

An operation dialog 20 is displayed when the printer utility 5 is activated. When a head position adjustment button 21 is pressed, the printer utility 5 starts head position adjustment. When an exist button 22 is pressed, the printer utility 5 ends head position adjustment after closing the operation dialog 20.

Figure 4:
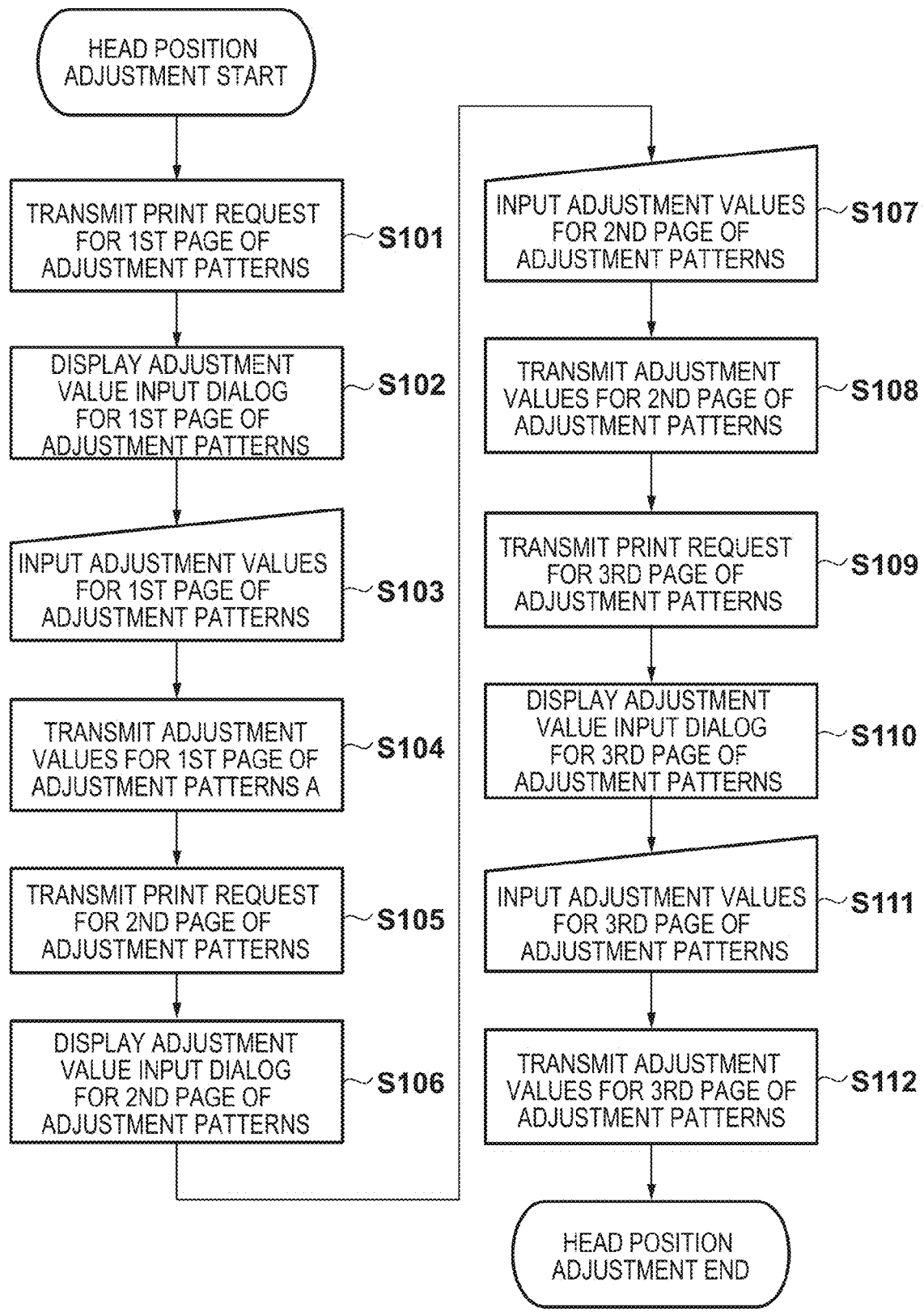
FIG. 4 is a flowchart showing processing by the printer utility at the time of head position adjustment.

FIG. 4 is a flowchart showing an overview of the processing by the printer utility 5 in the case where head position adjustment is executed without being interrupted partway through. Note that a program that supports the processing shown in the flowchart shown in FIG. 4 is stored in the ROM of the PC 1, and the processing shown in FIG. 4 is realized by the CPU of the PC 1 executing this program on the RAM.

The head position adjustment that is executed by the processing of the flowchart shown in FIG. 4 is performed by repeating a set of steps consisting of an adjustment pattern printing step (first control step) and an adjustment value setting step (second control step). That is, the head position adjustment is performed by the first control step for controlling the printing apparatus and the second control step for controlling the printing apparatus based on the control result of the first control step being repeated a plurality of times.

In Embodiment 1, there are three pages of adjustment patterns to be printed, and the above steps are repeated three times. The operation dialog 20 of the printer utility 5 in FIG. 3 is displayed on the display portion 2 under display control by the CPU of the PC 1. When the user presses the head position adjustment button 21 on the operation dialog 20 using the input and operation portion 3, the CPU of the PC 1 displays a printing start dialog 30 shown in FIG. 5A, and guides the user to start printing of the first page of adjustment patterns. In step S100, the processing of the flowchart shown in FIG. 4 is started in response to the user pressing an OK button 31 on the printing start dialog 30 using the input and operation portion 3. Also, once the processing has been started as described above, the printer utility 5 closes the printing start dialog 30, and stores the adjustment date in the adjustment information storage portion 4.

At step S101, the printer utility 5 generates a control command (printing request) for controlling printing of the first page of adjustment patterns, and transmits the control command to the printer 11.

Figure 6:
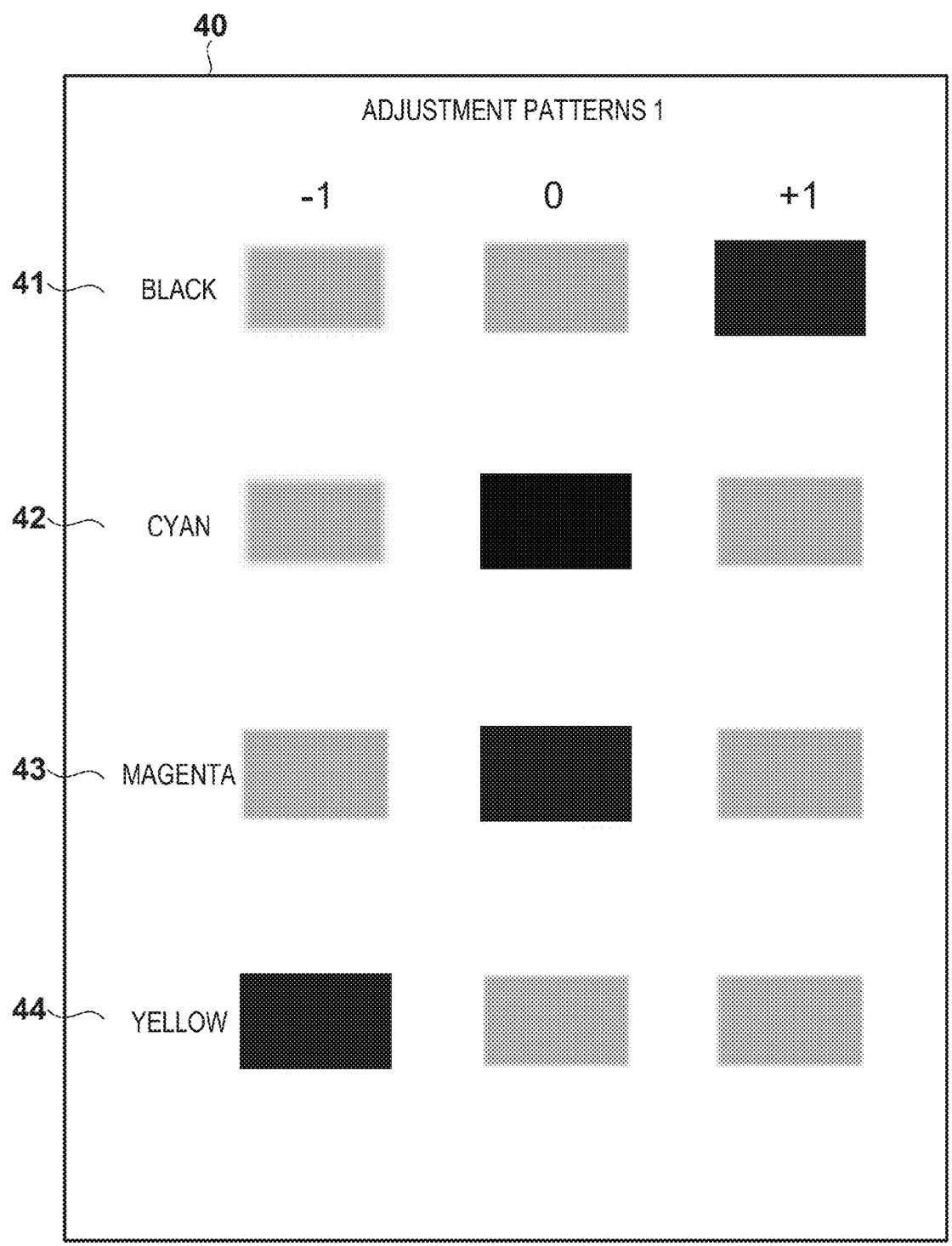
FIG. 6 is a diagram showing a result of printing result of printing a first page of adjustment patterns.

The printer 11 prints a first page of adjustment patterns 40 shown in FIG. 6 based on the received control command. The patterns 41 to 44 of the adjustment patterns 40 are respectively the adjustment patterns for black ink, cyan ink, magenta ink, and yellow ink. The printer 11 prints patterns for each color that are based on the state of the initial values that were set before head position adjustment, and specific dot-shifted patterns in which the adhesion positions of the ink droplets discharged from the nozzles of the print head are shifted. In Embodiment 1, the initial value patterns are printed in a "0" column, and two types of specific dot-shifted patterns are printed in a "−1" column and a "+1" column.

The printer utility 5, upon detecting that printing of the first page of adjustment patterns with the printer 11 has been completed, saves "1" to the adjustment information storage portion 4 as the printed page number of the adjustment patterns. Next, at step S102, the printer utility 5 displays an adjustment value input dialog 50 shown in FIG. 7A for inputting adjustment values for the first page of adjustment patterns. At step S103, the printer utility 5 inputs the adjustment values that are input by the user with reference to the first page of adjustment patterns. The user is able to input adjustment values for black ink, cyan ink, magenta ink and yellow ink with the popup menus 51 to 54 on the adjustment value input dialog 50. The user selects the pattern that is most uniformly printed without unevenness for each color from "−1", "0" and "+1", with reference to the printing result of the first page of adjustment patterns, and inputs the adjustment values thereof.

When a set key 55 is pressed on the adjustment value input dialog 50, the printer utility 5 closes the adjustment value input dialog 50. At step S104, the printer utility 5 then saves the input adjustment values to the adjustment information storage portion 4 as adjustment input values for the colors of the first page of adjustment patterns. A setting command for setting the input adjustment values for the first page of adjustment patterns in the printer 11 is then generated and transmitted to the printer 11.

The printer 11, upon receiving the adjustment value setting command, sets the adjustment values by saving the adjustment values to the setting information storage portion 15.

The printer utility 5, upon detecting that setting of the adjustment values in the printer 11 has been completed, saves "1" to the adjustment information storage portion 4 as the set page number of the adjustment values. A printing start dialog 32 shown in FIG. 5B for starting printing of the second page of adjustment patterns is then displayed. When the user presses an OK button 33 on the printing start dialog 32, the printer utility 5 closes the printing start dialog 32, similarly to the first page. At step S105, the printer utility 5 generates a control command (printing request) for controlling printing of the second page of adjustment patterns and transmits the control command to the printer 11.

The printer 11 prints a second page of adjustment patterns 80 shown in FIG. 8 based on the received control command. Patterns 81 to 84 of the adjustment patterns 80 are the respectively adjustment patterns for black ink, cyan ink, magenta ink, and yellow ink. The printer 11 prints patterns for each color that are based on the state of the initial values and two types of specific dot-shifted patterns in which the adhesion positions of the ink droplets discharged from the nozzles of the print head are shifted in columns "−1", "0", and "+1". Note that the patterns that are printed differ from the first page.

The printer utility 5, upon detecting that printing of the second page of adjustment patterns with the printer 11 has been completed, saves "2" to the adjustment information storage portion 4 as the printed page number of the adjustment patterns. Next, at step S106, the printer utility 5 displays an adjustment value input dialog 60 shown in FIG. 7B for inputting adjustment values for the second page of adjustment patterns. At step S107, the printer utility 5 then inputs the adjustment values that are input by the user with reference to the second page of adjustment patterns, similarly to the first page. Here, the user selects the pattern with the least shift between the top and bottom lines for each color, and inputs the adjustment values thereof.

When a set key 65 is pressed on the adjustment value input dialog 60, the printer utility 5 closes the adjustment value input dialog 60. At step S108, the printer utility 5 then saves the input adjustment values to the adjustment information storage portion 4 as adjustment input values for the colors of the second page of adjustment patterns, similarly to the first page. A setting command for setting the input adjustment values for the second page of adjustment patterns in the printer 11 is then generated and transmitted to the printer 11.

The printer 11, upon receiving when the adjustment value setting command, sets the adjustment values by saving the adjustment values to the setting information storage portion 15.

The printer utility 5, upon detecting that setting of the adjustment values in the printer 11 has been completed, saves "2" to the adjustment information storage portion 4 as the set page number of the adjustment values. A printing start dialog 34 shown in FIG. 5C for starting printing of the third page of adjustment patterns is then displayed. When the user presses an OK button 35 on the printing start dialog 34, the printer utility 5 closes the printing start dialog 34, similarly to the first page. At step S109, the printer utility 5 then generates a control command (printing request) for controlling printing of the third page of adjustment patterns, and transmits the control command to the printer 11.

The printer 11 prints a third page of adjustment patterns 90 shown in FIG. 9 based on the received control command. Patterns 91 to 94 of the adjustment patterns 90 are respectively adjustment patterns for black ink, cyan ink, magenta ink, and yellow ink. The printer 11 prints patterns for each color that are based on the state of the initial values and two types of specific dot-shifted patterns in which the adhesion positions of ink droplets that are discharged from the nozzle of the print head are shifted in columns "−1", "0" and "+1", similarly to the first page. Note that the patterns that are printed differ from the first page and the second page.

The printer utility 5, upon detecting that printing of third page of adjustment patterns with the printer 11 has been completed, saves "3" to the adjustment information storage portion 4 as the printed page number of the adjustment patterns. Next, at step S110, the printer utility 5 displays an adjustment value input dialog 70 shown in FIG. 7C for inputting adjustment values for the third page of adjustment patterns. At step S111, the printer utility 5 then inputs the adjustment values that are input by the user with reference to the third page of adjustment patterns, similarly to the first page. Here, the user selects the pattern with least shift between the right and left lines for each color, and inputs the adjustment values thereof.

When a set key 75 is pressed on the adjustment value input dialog 70, the printer utility 5 closes the adjustment value input dialog 70. At step S112, the printer utility 5 then saves the input adjustment values to the adjustment information storage portion 4 as adjustment input values for the colors of the third page of adjustment patterns, similarly to the first page. A setting command for setting the input adjustment values for the third page of adjustment patterns in the printer 11 is then generated and transmitted to the printer 11.

The printer 11, upon receiving the adjustment value setting command, sets the adjustment values by saving the adjustment values to the setting information storage portion 15.

The printer utility 5, upon detecting that setting of the adjustment values in the printer 11 has been completed, saves "3" to the adjustment information storage portion 4 as the set page number of the adjustment values. Thereafter, head position adjustment is ended.

Head position adjustment is thus completed by performing the adjustment pattern printing step and the adjustment value setting step three times. In Embodiment 1, it is assumed that, as the adjustment value setting step, the printer utility 5 displays an adjustment value input dialog and transmits adjustment values input by the user to the printer 11, but the present invention is not limited thereto. For example, if the apparatus is a multifunction peripheral or the like having a print function and a scan function, a configuration may be adopted in which printed adjustment patterns are scanned and appropriate adjustment values are set based on the scanning result.

Figure 10B:
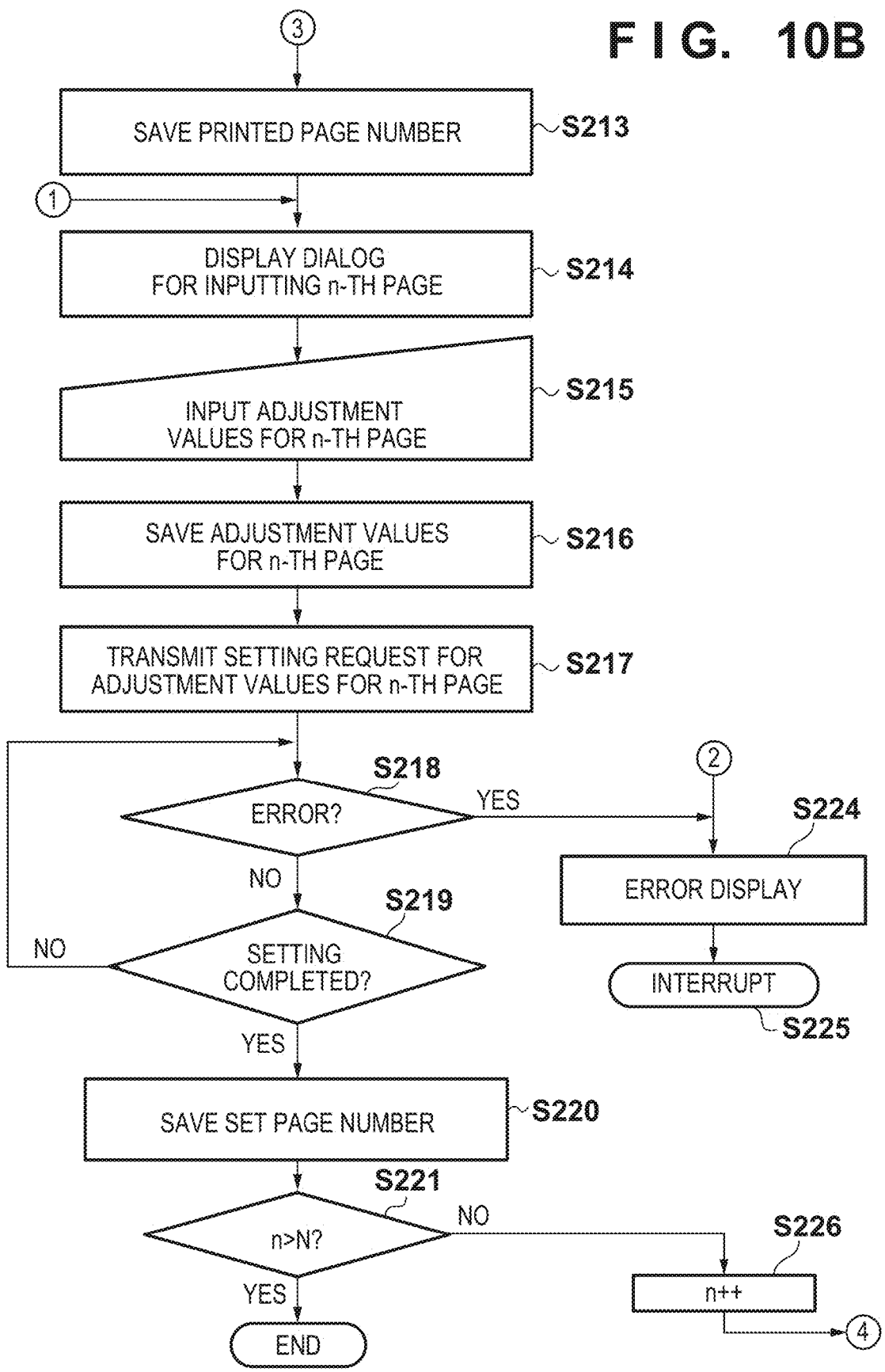
FIG. 10B is a flowchart showing details of processing for head position adjustment.

FIGS. 10A and 10B are a flowchart showing details of processing for head position adjustment premised on interruption and resumption of processing. Note that the flowchart shown in FIGS. 10A and 10B are realized by the CPU of the PC 1 executing a program stored in the ROM of the PC 1.

When the head position adjustment button 21 of the operation dialog 20 of the printer utility 5 is pressed, the printer utility 5 starts head position adjustment. At step S201, the printer utility 5, upon starting head position adjustment, initially searches for adjustment information of the last head position adjustment saved in the adjustment information storage portion 4. The date and progress status when head position adjustment was last executed and the input values (adjustment information) for adjustment of the colors of each page are saved in the adjustment information storage portion 4. At step S202, the printer utility 5 determines whether there is adjustment information from last time.

If there is adjustment information (YES at step S202), the printer utility 5, at step S203, acquires the adjustment information from last time. Next, at step S204, the printer utility 5 sets a start page n and a start step based on the acquired adjustment information. The start step is set to either the adjustment pattern printing step or the adjustment value setting step. The details of this processing will be discussed later. When setting of the start page and the start step has been completed, the printer utility 5, at step S205, deletes the adjustment information of the last head position adjustment that is already saved in the adjustment information storage portion 4.

On the other hand, if, at step S202, there is not adjustment information from last time (NO at step S202), the printer utility 5, at step S223, sets the start page n to 1, and sets the start step to printing of adjustment patterns. Next, at step S206, the printer utility 5 newly saves the adjustment date corresponding to the current adjustment processing to the adjustment information storage portion 4. Next, at step S207, the printer utility 5 sets the total number of pages of adjustment patterns as N. In Embodiment 1, because printing of three pages of adjustment patterns and setting of adjustment values based thereon is performed, N is set to 3.

At step S208, the printer utility 5 then determines whether the start step starts from printing of adjustment patterns or from setting of adjustment values. Note that information indicating whether the start step is the printing step or the setting step is set in the above step S204. Details of the start step setting processing will be discussed later using FIG. 11.

In the case of starting from printing of adjustment patterns (YES at step S208), the printer utility 5, at step S209, displays a dialog for starting printing of the n-th page of the adjustment patterns.

On the other hand, in the case of starting from setting of adjustment values (NO at step S208), the printer utility 5, at step S214, displays a dialog for inputting adjustment values for the n-th page.

When the user presses the OK button of the adjustment pattern printing start dialog, the printer utility 5, at step S210, generates a control command for controlling printing of the n-th page of adjustment patterns, and transmits the control command to the printer 11. Thereafter, at step S211, the printer utility 5 monitors for errors during execution of the processing. If an error has occurred (YES at step S211), the printer utility 5, at step S224, displays an error dialog 120 shown in FIG. 13. When an OK button 121 is pressed, the printer utility 5, at step S225, closes the error dialog and interrupts head position adjustment.

Here, errors include, for example, a paper jam occurring in the printer 11 during printing, communication between the PC 1 and the printer 11 being cut, the processing being interrupted by another job, and the like. Note that the cause of adjustment processing being interrupted is not limited to errors such as described above, and may be an interruption instruction given by the user through the input and operation portion 3 of the PC 1 or an operation unit of the printer 11 not illustrated. Alternatively, the processing may be interrupted due to the printer 11 being powered OFF by a user operation, a power outage, or the like.

On the other hand, in the case where an error has not occurred (NO at step S211), the printer utility 5, at step S212, determines whether transmission of the control command and printing of adjustment patterns by the printer 11 have been completed. In the case where transmission of the control command and printing of the adjustment patterns by the printer 11 have not been completed (NO at step S212), the processing returns to step S211, and the printer utility 5 stands by until printing is completed.

On the other hand, in the case where transmission of the control command and printing of adjustment patterns by the printer 11 have been completed (YES at step S212), the printer utility 5, at step S213, saves the page number n of the page for which printing was completed to the adjustment information storage portion 4 as a printed page number np of the adjustment patterns. Subsequently, at step S214, the printer utility 5 displays a dialog for inputting adjustment values for the n-th page. When the user presses the set key of the adjustment value input dialog, the printer utility 5, at step S215, inputs the input adjustment values as adjustment input values for the colors of the n-th page. At step S216, the printer utility 5 saves the adjustment values to the adjustment information storage portion 4. At step S217, the printer utility 5 then generates a setting command (adjustment value setting request) for adjustment values including the adjustment values input in step S215, and transmits the setting command to the printer 11. When the printer 11 receives the adjustment value setting request as a result of the processing of the PC 1 in step S217, the CPU of the printer 11 stores the adjustment values included in the adjustment value setting request in the setting information storage portion 15 of the printer 11.

At step S218, the printer utility 5 monitors for errors during execution of the processing. If an error has occurred (YES at step S218), the processing advances to step S224. Here, errors include the processing being interrupted by another job during setting in the printer 11.

On the other hand, in the case where an error has not occurred (NO at step S218), the printer utility 5, at step S219, determines whether transmission of the setting command and setting of adjustment values in the printer 11 have been completed. In the case where transmission of the setting command and setting of adjustment values in the printer 11 have not been completed (NO at step S219), the processing returns to step S218, and the printer utility 5 stands by until setting is completed.

On the other hand, in the case where transmission of the setting command and setting of adjustment values in the printer 11 have been completed (YES at step S219), the printer utility 5, at step S220, saves the page number n of the page used in the setting to the adjustment information storage portion 4 as a set page number ns.

At step S221, the printer utility 5, upon head position adjustment of the n-th page ending without an error occurring, compares the adjustment completed page number n with the total number of pages N of adjustment patterns, and determined whether to proceed to printing of the next page of adjustment patterns. If not n≥N, or in other words, in the case of proceeding to the next page (NO at step S221), the printer utility 5 increments n at step S226. Thereafter, the proceeding advances to step S209 and the printer utility 5 displays a dialog for starting printing of the next page of adjustment patterns.

On the other hand, if n≥N, or in other words, in the case of not proceeding to printing of the next page of adjustment patterns) (YES at step S221), the printer utility 5 ends head position adjustment.

Note that the present invention is not limited to the case where an adjustment value input dialog for inputting adjustment values is displayed in S214 and the user inputs adjustment values in S215, and adjustment values may be input by pages of adjustment patterns being read by a reading apparatus not illustrated.

Also, display of dialogs and input of adjustment values by the user are not limited to being executed by the PC 1 as described above, and may be executed by a display apparatus or an operation device not illustrated that is integrated into or external to the printer 11.

Furthermore, in the processing shown in FIGS. 10A and 10B, an example in which printing of adjustment patterns and input of adjustment values for the adjustment patterns are repeated sequentially for every page was described. However, the present invention is not limited thereto, and after printing all the pages of adjustment patterns, the adjustment values corresponding to all of the pages may be input manually by the user or automatically by a reading apparatus such as described above.

Figure 11:
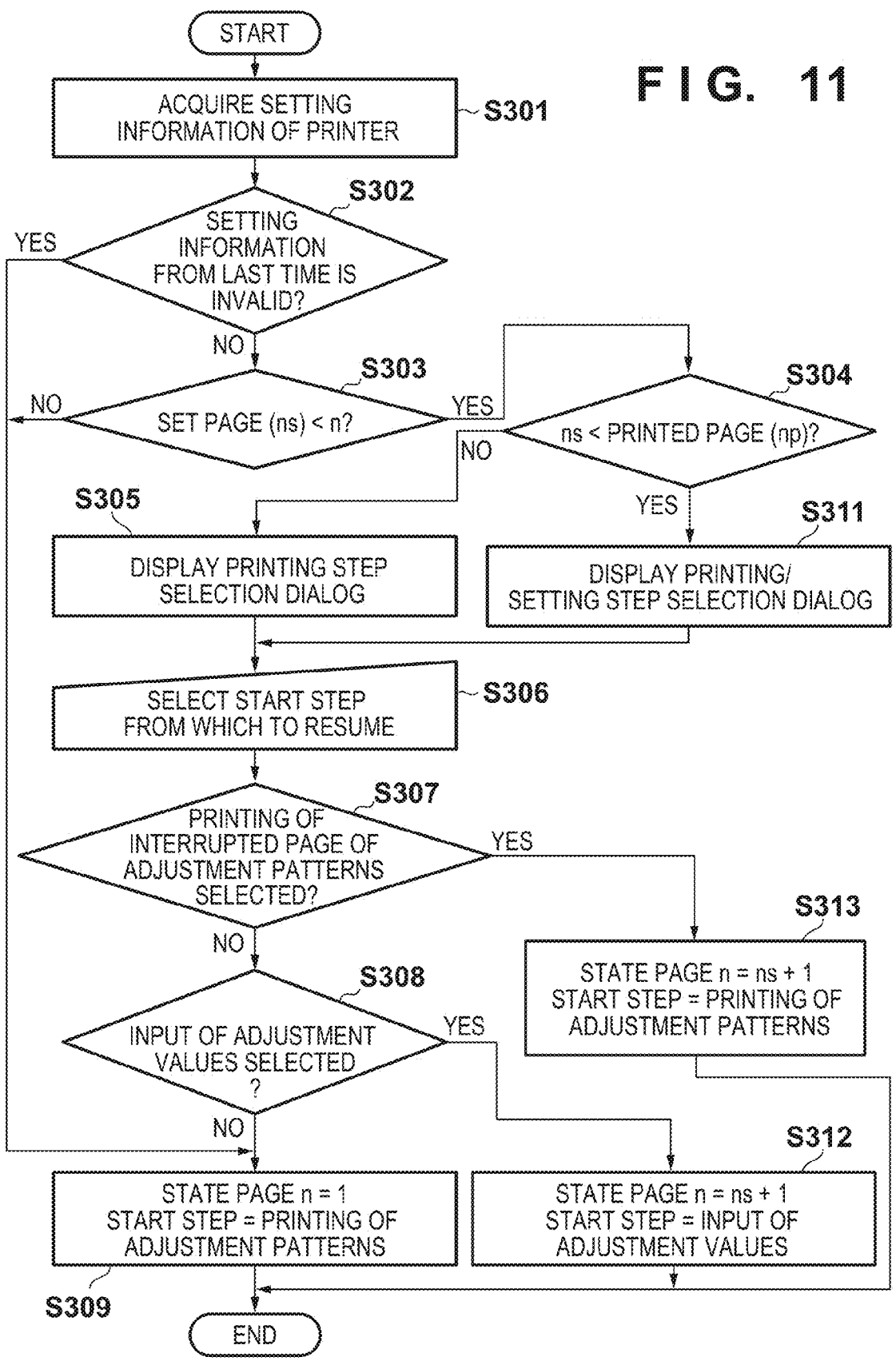
FIG. 11 is a flowchart showing details of processing for setting a start page and a start step.

FIG. 11 is a flowchart showing details of the processing for setting the start page and the start step based on the information on the last head position adjustment in step S204 of FIG. 10A.

During the processing performed here, the printer utility 5 is able to refer to the adjustment date, the printed page number np and the set page number ns that are included in the last adjustment information acquired at step S203 of FIG. 10A.

At step S301, the printer utility 5 initially acquires, as setting information of the printer 11, the adjustment information relating to the head position adjustment saved in the setting information storage portion 15 of the printer 11 (setting information acquisition portion). In the setting information storage portion 15, the adjustment values of the head position set in the printer 11 and the head reinstallation state of the print head after the head position adjustment values were set last time are saved as adjustment information. Note that the above-mentioned adjustment values of the head position are stored in the setting information storage portion 15 of the printer 11 when adjustment was last performed, as a result of the processing in step S217.

Next, at step S302, the printer utility 5 determines whether the adjustment information of the last head position adjustment is valid/invalid.

Here, if a specific (predetermined) amount of time has elapsed since the last adjustment date (execution date) relative to the current time, the adjustment information of the last head position adjustment is determined to be invalid, since adjustment needs to be performed from the beginning in this case. Also, in the case where the adjustment values of the head position set in the setting information storage portion 15 of the printer 11 differs from the last adjustment input values saved to the adjustment information storage portion 4 of the PC 1 for the pages for which adjustment values have been set, it can be determined that the adjustment values in the printer 11 were changed by another PC (user) after adjustment was last performed. Thus, the adjustment information of the last head position adjustment is also determined to be invalid in this case. Also, when it is determined that the print head has been reinstalled after adjustment of the head position, the information of the last head position adjustment is determined to be invalid, since error correction of the attachment position of the head needs to be performed from the beginning.

If the adjustment information of the last head position adjustment is determined to be invalid (YES at step S302), the printer utility 5, at step S309, sets the start page n to 1, and sets the start step to printing of adjustment patterns.

On the other hand, if the adjustment information of the last head position adjustment is determined to be valid (NO at step S302), the printer utility 5, at step S303, compares the total number of pages (N) of adjustment patterns with the set page number (ns) of adjustment values that is acquired from the last adjustment information acquired at step S203, and determines whether adjustment was completed for all pages last time.

If not ns<N, or in other words, if adjustment was completed for all pages last time (NO at step S303), at step S309, the printer utility 5 sets the start page n to 1, and sets the start step as printing of adjustment patterns.

On the other hand, if ns<N, or in other words, if it is determined that adjustment was not completed for all pages last time (YES at step S303), the printer utility 5, at step S304, compares the set page number (ns) of adjustment values with the printed page number (np) of adjustment patterns that is acquired from the last adjustment information acquired at step S203. It is then determined, based on the comparison result, which of printing of adjustment patterns or setting of adjustment values was interrupted last time.

If ns<np (YES at step S304), it can be determined that printing of the page having the page number np was completed but that setting of the adjustment values for that page was not completed. In this case, the printer utility 5, at step S311, displays a selection dialog 140 such as shown in FIG. 14B for selecting the start step. In the selection dialog 140, the user is able to select, with a radio button 142, one of printing of the interrupted page (ns+1) of adjustment patterns, input of the adjustment values of the interrupted page (ns+1), and printing of the first page of the adjustment patterns, as the start step. Here, not only the interrupted setting step and the first step of head position adjustment but also a printing step for obtaining a printing result of adjustment patterns required in the interrupted setting step can be selected. Note that, in Embodiment 1, the option for setting the adjustment values of the interrupted page is displayed in a selected state as the default value, such that the uppermost of the three options is selected in FIG. 14B. By thus providing an option for resuming from input of setting values, it is possible, in the example in FIG. 14B, for example, for a user who has the printed second page of adjustment patterns to prevent this second page of adjustment patterns from being redundantly printed. Also, for example, in the case where the user has lost the printed second page of adjustment patterns, the user is able to select the middle option (resuming processing from printing of the second page of adjustment patterns) in FIG. 14B.

On the other hand, if it is determined that ns=np in step S304 (if not ns<np), it can be determined that, in the last adjustment processing adjustment, processing was interrupted without printing of the np+1-th page of adjustment patterns being completed. In this case, the printer utility 5, at step S305, displays a selection dialog 130 shown in FIG. 14A. In the selection dialog 130, the user is able to select, with a radio button 132, one of printing of the interrupted page (ns+1) of adjustment patterns and printing of the first page of adjustment patterns, as the start step. Here, starting head position adjustment from the beginning can also be selected in addition to the interrupted step. In Embodiment 1, printing of the interrupted page of adjustment patterns is displayed in a selected state as the default value.

When an OK button 131 of the selection dialog 130 or an OK button 141 of the selection dialog 140 is pressed, the printer utility 5, at step S306, selects the start step from which to resume processing, based on the selection. At step S307, the printer utility 5 determines whether the start step selected by the user is printing of the interrupted page of adjustment patterns.

If, as the start step, the user has selected to start from printing of the interrupted page of adjustment patterns (YES at step S307), the printer utility 5, at step S313, sets the start page n to the interrupted page, and sets the start step to printing of adjustment patterns.

On the other hand, if the user has not selected to start from printing of the interrupted page of adjustment patterns as the start step (NO at step S307), the printer utility 5, at step S308, determines whether the start step selected by the user is setting of the adjustment values of the interrupted page.

If, as the start step, the user has selected to start from setting of the adjustment values of the interrupted page (YES at step S308), the printer utility 5, at step S312, sets the start page n to the interrupted page, and sets the start step to setting of adjustment values.

On the other hand, if the user has not selected to start from setting of the adjustment values of the interrupted page as the start step (NO at step S308), or in other words, if the user has selected to start from printing of the first page of adjustment patterns, the printer utility 5 sets the start page n to 1, and sets the start step to printing of adjustment patterns.

Note that, in processing of FIG. 11, it is assumed that the user selects from setting and printing steps as the start step, as shown in FIG. 14B, but the present invention is not limited thereto, and the user may select the setting step as the start step. Also, in this case, a configuration may be adopted in which, for example, a setting screen of the setting step is displayed as a display screen and printing of the relevant page can be designated on the setting screen.

Figure 12B:
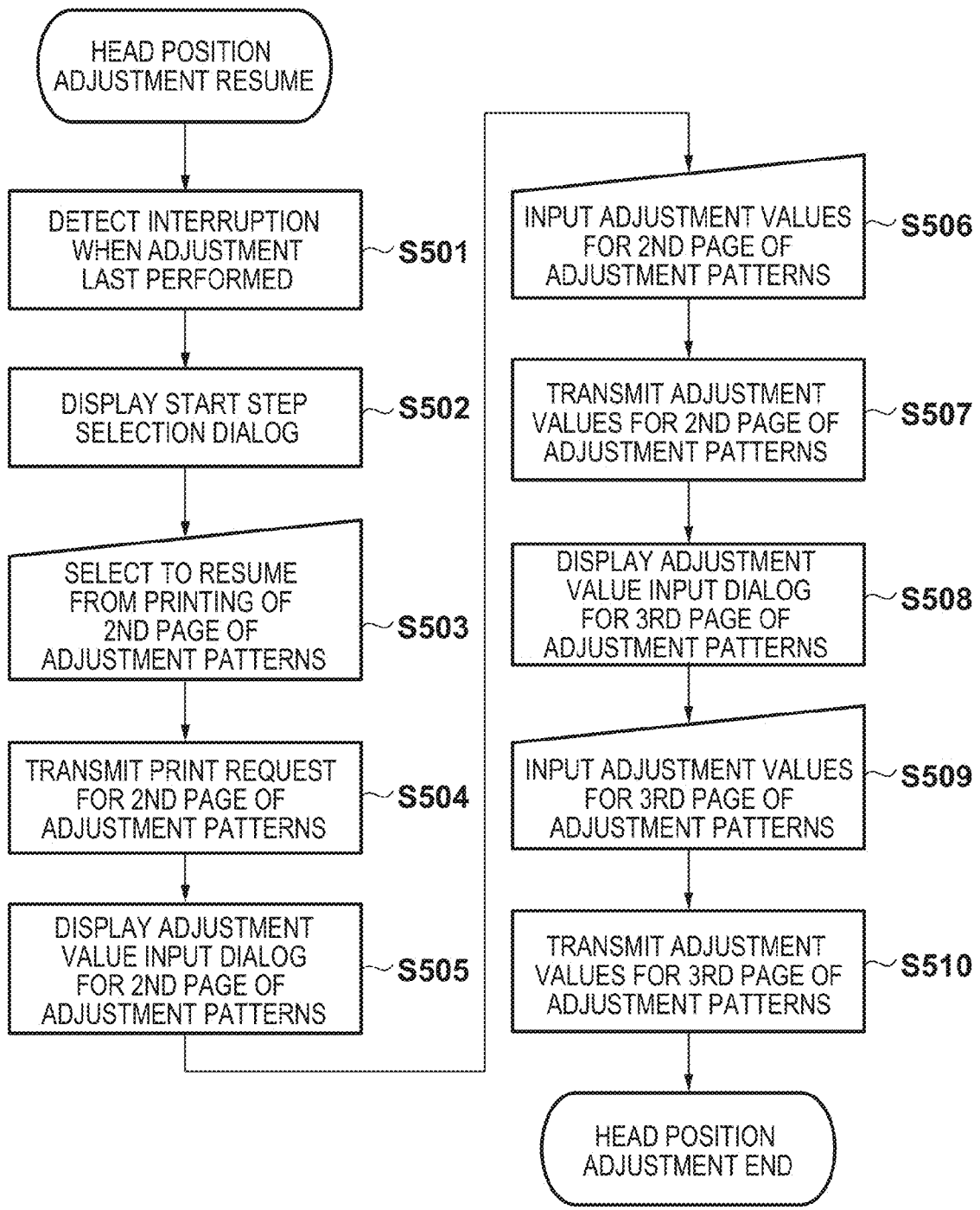
FIG. 12B is a flowchart showing exemplary interruption and resume processing at the time of head position adjustment.

FIGS. 12A and 12B are flowcharts showing exemplary processing that is performed when head position adjustment is interrupted partway through and subsequently resumed in accordance with the flowchart shown in FIGS. 10A, 10B and 11.

At steps S401 to S404 of FIG. 12A, the printer utility 5 transmits a printing request and adjustment values for the first page of adjustment patterns to the printer 11. This processing is similar to steps S101 to S104 of FIG. 4.

At step S405, the printer utility 5 transmits a printing request for the second page of adjustment patterns to the printer 11. At step S406, the printer utility 5 displays the adjustment value input dialog 60. At step S408, the printer utility 5 then transmits the adjustment values input by the user via the adjustment value input dialog 60 to the printer 11. Here, when some type of error occurs, the printer utility 5 displays the error and ends head position adjustment. Here, assume that, after the adjustment patterns have been printed, the user accidentally powers off the printer 11 before transmission of the adjustment values is completed. If the printer 11 is powered off, the printer utility 5 is unable to transmit the adjustment values.

At step S409, the printer utility 5 detects that the printer 11 has been powered off. At step S410, the printer utility 5 displays the error dialog 120 shown in FIG. 13. Head position adjustment is then interrupted.

Subsequently, when the user starts head position adjustment again, the printer utility 5, having determined, at step S501 of FIG. 12B, that the information of the last head position adjustment is valid, and that processing was interrupted during the adjustment value setting step last time, displays the selection dialog 140 shown in FIG. 14B for selecting the start step at step S502.

In this selection dialog 140, the user is able to select, as the start step, one of input of the adjustment values of the interrupted second page, printing of the second page of adjustment patterns required when inputting the adjustment values of the second page, and printing of the first page of adjustment patterns. The user is able to appropriately resume the interrupted head position adjustment by selecting input of adjustment values of the second page if he or she has the second page of adjustment patterns printed when head position adjustment was performed last time, and selecting printing of the second page of adjustment patterns if he or she does not have the printed second page at hand. The user is also able to start from the beginning if he or she wants to perform head position adjustment again from the start. Here, assume that the user, having lost the second page of adjustment patterns printed last time, has selected to resume from printing of the second page of adjustment patterns.

When the user selects to resume from printing of the second page of adjustment patterns, the printer utility 5, at step S503, selects to resume from printing of the second page of adjustment patterns. At step S504, the printer utility 5 transmits a printing request for the second page of adjustment patterns to the printer 11, in order to resume from printing of the second page of adjustment patterns. At steps S504 to S510, the printer utility 5 then transmits printing requests and adjustment values for the second and third pages of adjustment patterns to the printer 11, and ends the processing. Here, steps S504 to S510 are similar to steps S105 to S111 of FIG. 4.

Next, the processing of the printer driver 6 that is performed when a print job is executed from various application software via the printer driver 6 will be described.

Figure 15:
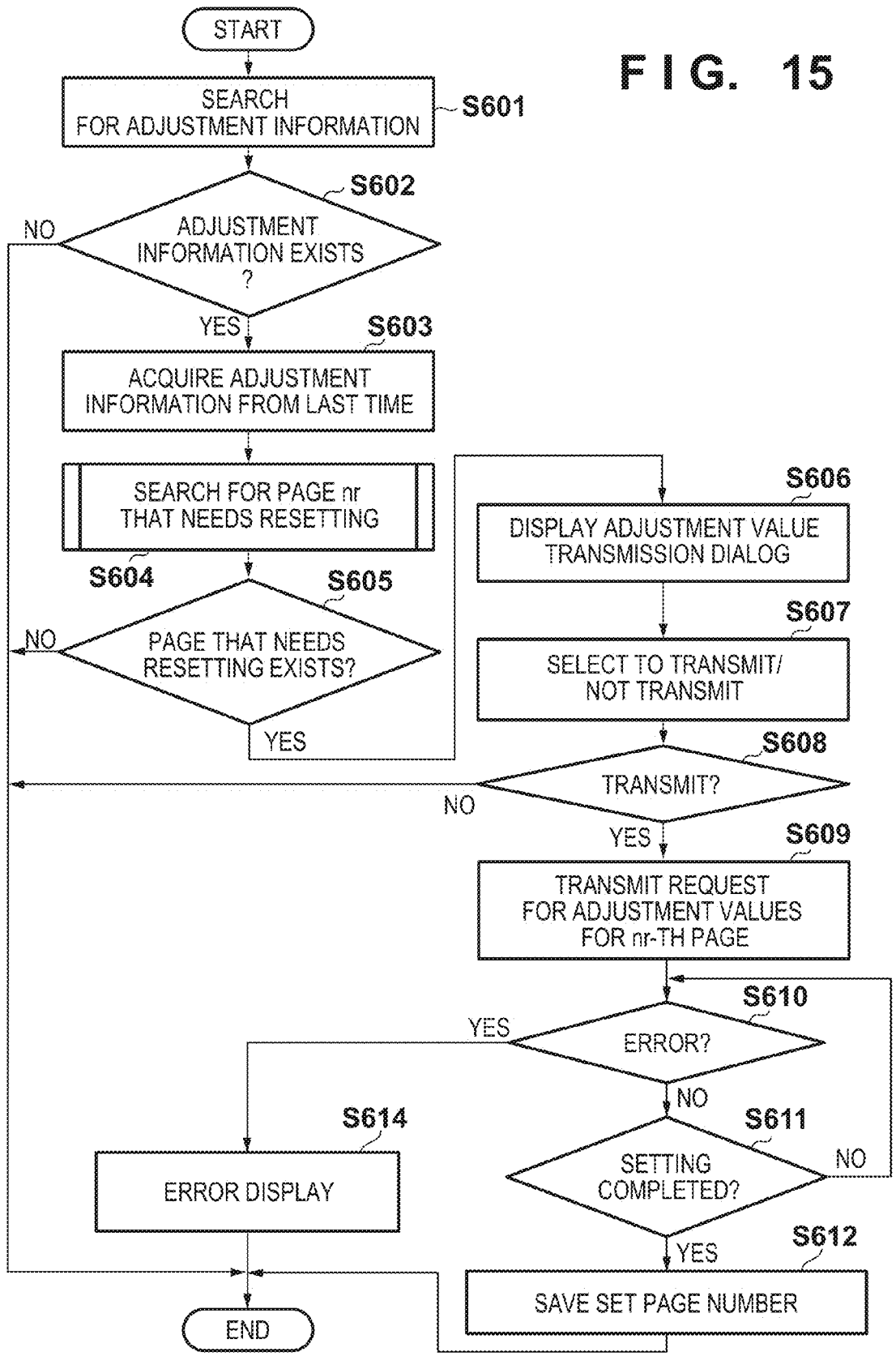
FIG. 15 is a flowchart showing details of processing for resetting head position adjustment.

FIG. 15 is a flowchart showing details of processing for resetting head position adjustment values that is performed by the printer driver 6 before the start of printing.

At step S601, the printer driver 6 initially searches for the adjustment information of the last head position adjustment saved in the adjustment information storage portion 4. At step S602, the printer driver 6 determines whether there is adjustment information from last time. If it is determined that there is no adjustment information from last time (NO at step S602), the printer driver 6 ends the processing and proceeds to print processing.

On the other hand, in the case where there is adjustment information from last time (YES at step S602), the printer driver 6, at step S603, acquires the adjustment information from last time. Next, at step S604, the printer driver 6 checks the setting state of the adjustment values from last time, determines whether resetting is required, and searches for a page nr that needs resetting. For example, it is determined that resetting is required in the case where setting of adjustment values is not completed, such as where an error occurs due to communication being cut at the time of transmission of a control command for controlling setting of adjustment values during head position adjustment last time or where an error occurs due to the processing being interrupted by another job. The details of this processing will be discussed later.

Next, at step S605, the printer driver 6 determines whether there is a page that needs resetting. If there is no pages that need resetting (NO at step S605), the printer driver 6 ends the processing and proceeds to print processing.

Figure 16A:
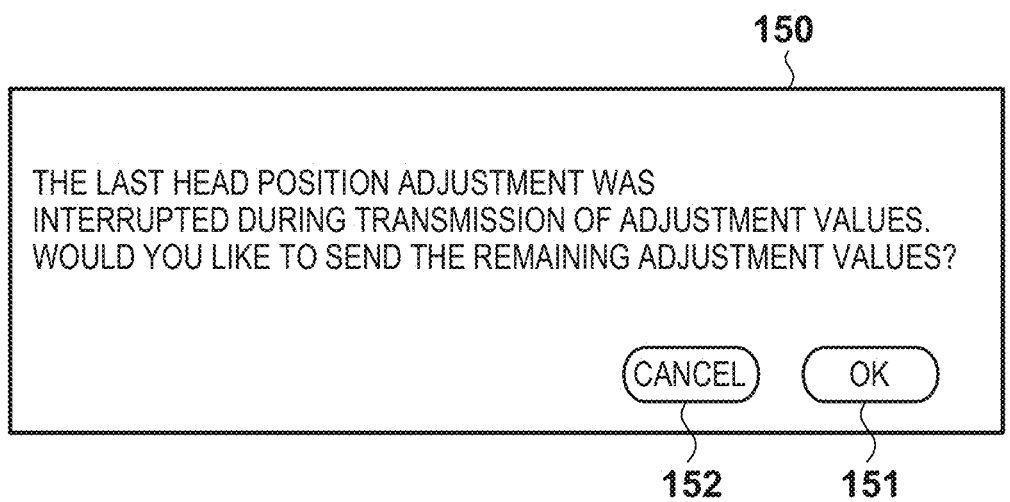
FIG. 16A is a diagram showing a dialog that is displayed at the time of processing for resetting head position adjustment.

On the other hand, if there is a page that needs resetting (YES at step S605), the printer driver 6, at step S606, displays an adjustment value transmission dialog 150 shown in FIG. 16A. An OK button 151 and a cancel button 152 are disposed in the adjustment value transmission dialog 150, with adjustment values being transmitted when the user presses the OK button 151, and adjustment values not being transmitted when the user presses Cancel button 152.

At step S607, the printer driver 6 selects the OK button 151 or the cancel button 152 according to an operation performed on the adjustment value transmission dialog 150 by the user. At step S608, the printer driver 6 determines whether to transmit adjustment values according to the selection. If the cancel button 152 is selected (NO at step S608), the printer driver 6 ends the processing and proceeds to print processing after closing the adjustment value transmission dialog 150.

On the other hand, in the case where the OK button 151 is selected (YES at step S608), the printer driver 6 closes the adjustment value transmission dialog 150. Thereafter, at step S609, the printer driver 6 generates a setting command for setting adjustment values for the nr-th page that needs resetting, based on the adjustment input value for each color saved to the adjustment information storage portion 4, and transmits the setting command to the printer 11.

Figure 16B:
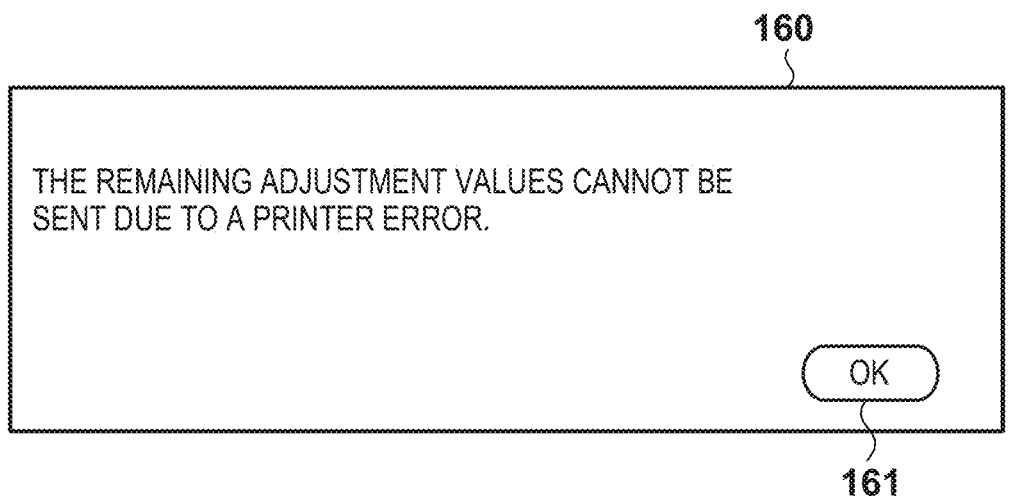
FIG. 16B is a diagram showing a dialog that is displayed at the time of processing for resetting head position adjustment.

Thereafter, at step S610, the printer driver 6 monitors for errors during execution of processing. If an error has occurred (YES at step S610), the printer driver 6, at step S614, displays an error dialog 160 shown in FIG. 16B. Here, the printer driver 6 ends the processing and advances to print processing after closing the error dialog 160, when an OK button 161 of the error dialog 160 is pressed.

On the other hand, in the case where an error has not occurred (NO at step S610), the printer driver 6, at step S611, determines whether transmission of the setting command and setting of adjustment values in the printer 11 are completed. If transmission of the setting command and setting of adjustment values in the printer 11 are not completed (NO at step S611), the processing returns to step S610, and the printer driver 6 stands by until setting is completed.

On the other hand, if transmission of the setting command and setting of adjustment values in the printer 11 have been completed (YES at step S611), the printer driver 6, at step S612, saves nr to the adjustment information storage portion 4 as the set page number. Thereafter, the printer driver 6 ends the processing and advances to the print processing.

Figure 17:
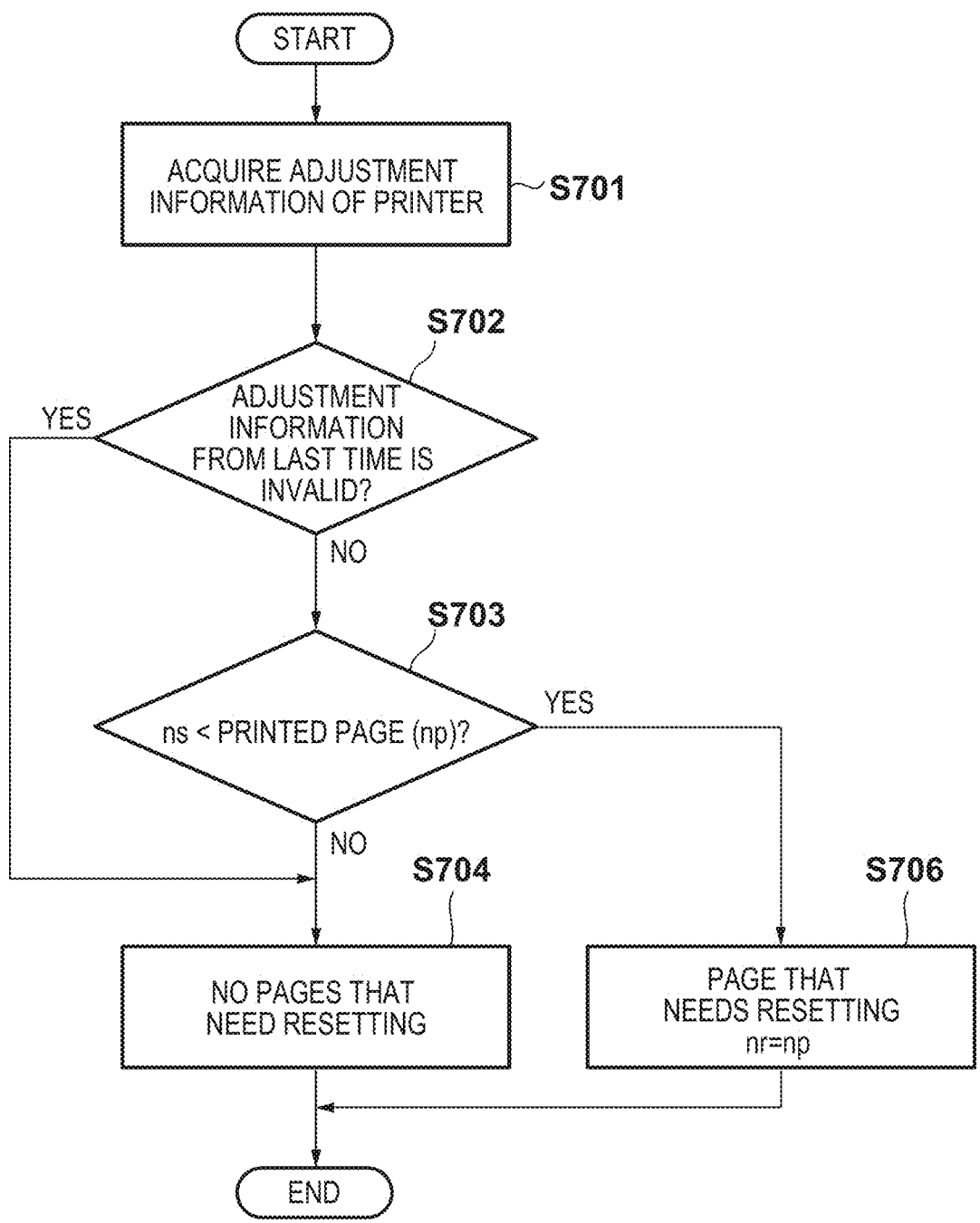
FIG. 17 is a flowchart showing processing for searching for a page that needs resetting of adjustment values.

FIG. 17 is a flowchart showing details of the processing for searching for a page that needs resetting of adjustment values based on the information of the last head position adjustment in step S604 of FIG. 15.

At step S701, the printer driver 6 initially acquires, as setting information on the printer 11, adjustment information relating to head position adjustment saved in the setting information storage portion 15 of the printer 11 (setting information acquisition portion). In the setting information storage portion 15 are saved, as adjustment information, the adjustment values of the head position set in the printer 11 and the head reinstallation state of the print head after setting the head position adjustment values.

At step S702, the printer driver 6 determines whether the adjustment information of the last head position adjustment is valid/invalid.

Here, if a specific (predetermined) amount of time has elapsed since the last adjustment date relative to the current time, the adjustment information of the last head position adjustment is determined to be invalid, since adjustment needs to be performed from the beginning in this case. Also, if the adjustment values of the head position set in the printer 11 for the page for which adjustment values were set differs from the last adjustment input values saved in the PC 1, the adjustment information of the last head position adjustment is determined to be invalid, since it can determine that the adjustment values have been changed by another PC (user) after adjustment was last performed. Also, when it is determined that the print head has been reinstalled after adjustment of the head position, it is determined that the adjustment information of the last head position adjustment is invalid, since error correction of the attachment position of the head needs to be performed from the beginning.

If the adjustment information of the last head position adjustment is determined to be invalid (YES at step S702), the printer driver 6, at step S704, determines that the adjustment values do not need to be reset before the start of printing. In other words, it is determined that there are no pages that need resetting.

On the other hand, if the adjustment information of the last head position adjustment is determined to be valid (YES at step S702), the printer driver 6, at step S703, compares the set page number (ns) of adjustment values with the printed page number (np) of adjustment patterns, and determines which of printing of adjustment patterns and of setting of adjustment values was interrupted last time.

If ns<np, or in other words, if processing was interrupted during setting of adjustment values (YES at step S703) the printer driver 6, at step S706, sets the page nr that needs resetting of adjustment values to the page np interrupted during setting of adjustment values, in order to perform resetting of adjustment values before the start of printing. On the other hand, if processing was interrupted during printing of the adjustment patterns (NO at step S703), the printer driver 6, at step S704, determines that the adjustment values do not need to be reset before the start of printing, and determines that there are no pages that need resetting.

As described above, according to Embodiment 1, the user is able to choose to resume from an appropriate step, when a series of processing consisting of a printing step for printing a specific pattern and a setting step for setting operations of the printer based on the result of the printing step is interrupted.

Note that, in the above embodiment, an example was described in which printing of adjustment patterns and setting of adjustment values is repeated per page, but the present invention is not limited thereto and setting of adjustment values may be performed after printing all the pages of adjustment patterns. Even in this case, according to the above embodiment, printing can be resumed from an interrupted page, in the case where a factors arises causing the processing to be interrupted during printing of adjustment patterns, for example. Also, in the case where an interruption factor occurs after printing but before setting, processing can be resumed from setting of adjustment values. Also, in the case where an interruption factor occurs during setting processing, setting processing can be resumed from the page for which adjustment values have not been set.

Also, setting of adjustment values is not limited to input by a user (manual input), and may be automatic input whereby adjustment values are input by adjustment patterns being read by a reading apparatus not illustrated.

Furthermore, in the above embodiment, position adjustment of the head in a printing apparatus was described as an example, but the processing described in the above embodiment is not limited thereto, and can also be applied to various types of setting processing on various types of devices.

Embodiment 2

The printing system of Embodiment 1 was constituted by a PC and a printer that were connected with a specific bidirectional interface rather by a standalone device, but the present invention is not limited thereto. For example, a device-integrated printing system (information processing apparatus) in which the function of such a PC and printer are integrated may be adopted. Alternatively, the CPU of the printer 11 may execute the processing described in the above embodiment.

According to the printing system of Embodiment 2, in a device-integrated printing system that is provided with a series of processing consisting of a printing step for printing step for printing specific patterns and a setting step for setting operations of a printer based on a result of the printing step, the user is able to select to resume from an appropriate step when the series of processing is interrupted.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiments of the present invention, and by a method performed by the computer of the system or apparatus by, for example, reading out and executing the computer executable instructions from the storage medium to perform the functions of one or more of the above-described embodiments. The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-181560, filed Sep. 2, 2013, which is hereby incorporated by reference herein in its entirety.

What is claimed is:

1. An information processing apparatus comprising:
an execution unit configured to execute, for each of a plurality of pages, both of a first control step for controlling a printing apparatus to print a single page and a second control step, for controlling the printing apparatus with regard to the single page, to be executed after completion of the first control step for the single page, wherein after completion of the first and second control steps for the single page, the execution unit executes both of the first and second control steps for another single page;
an interruption unit configured to interrupt the execution in a case where a predetermined interruption factor occurs during the execution of processing by the execution unit;
an acceptance unit configured to (i) in a case where the first control step is completed for a page of interest and the second control step is not completed for the page of interest as a result of the interruption, accept a selection instruction for instructing whether the first control step or the second control step is to be executed for the page of interest, and (ii) in a case where the first control step is not completed for the page of interest as the result of the interruption, accept a selection instruction for instructing that the first control step is to be executed for the page of interest, without accepting a selection instruction for instructing that the second control step is to be executed for the page of interest; and
a setting unit configured to set, as a start step to be resumed by the execution unit, a control step, corresponding to the selection instruction accepted by the acceptance unit, from among the first control step and the second control step.

2. The information processing apparatus according to claim 1, wherein the acceptance unit includes a display control unit configured (a) to display on a display apparatus a display screen on which a user can select whether the first control step or the second control step is to be executed for the page of interest in a case where the first control step is completed for the page of interest and the second control step is not completed for the page of interest as a result of the interruption, and (b) to display on the display apparatus a display screen on which the user can select that the first control step is to be executed for the page of interest and the user cannot select that the second control step is to be executed for the page of interest in a case where the first control step is not completed for the page of interest as the result of the interruption, and
wherein the setting unit sets the start step to the control step selected on the display screen.

3. The information processing apparatus according to claim 1, further comprising an acquisition unit configured to acquire setting information of the printing apparatus,
wherein the setting unit sets the start step to the first control step or the second control step, based on the setting information acquired by the acquisition unit.

4. The information processing apparatus according to claim 1, wherein the setting unit sets the start step to the first control step or the second control step, based on an execution date-time of when processing was last executed and a date-time corresponding to current processing by the execution unit.

5. The information processing apparatus according to claim 1, wherein the first control step is processing for causing the printing apparatus to execute print processing of a specific pattern, and
wherein the second control step is processing for setting an operation of the printing apparatus based on a printing result of the print processing.

6. The information processing apparatus according to claim 5, further comprising:
a control unit configured to control an operation of the printing apparatus;
a determination unit configured to determine, based on an execution history of the first control step or the second control step, whether processing by the second control step is required before printing by the printing apparatus is started by the control unit; and
a resetting unit configured to reset the operation of the printing apparatus with the second control step before printing by the printing apparatus is started by the control unit, based on a result of the determination by the determination unit.

7. The information processing apparatus according to claim 6, further comprising an acquisition unit configured to acquire setting information of the printing apparatus,
wherein the determination unit determines whether processing by the second control step is required before printing by the printing apparatus is started by the control unit, based on the setting information acquired by the acquisition unit and the execution history.

8. An information processing method comprising:
executing, for each of a plurality of pages, both of a first control step for controlling a printing apparatus to print a single page and a second control step, for controlling the printing apparatus with regard to the single page, to be executed after completion of the first control step for the single page, wherein after completion of the first and second control steps for the single page, the execution unit executes both of the first and second control steps for another single page;
interrupting the execution in a case where a predetermined interruption factor occurs during the execution of processing;
accepting (i) in a case where the first control step is completed for a page of interest and the second control step is not completed for the page of interest as a result of the interruption, a selection instruction for instructing whether the first control step or the second control step is to be executed for the page of interest, and (ii)

in a case where the first control step is not completed for the page of interest as the result of the interruption, a selection instruction for instructing that the first control step is to be executed for the page of interest, without accepting a selection instruction for instructing that the second control step is to be executed for the page of interest; and setting, as a start step to be resumed, a control step, corresponding to the accepted selection instruction, from among the first control step and the second control step.

9. A non-transitory computer-readable storage medium storing a program for causing a computer to function as units of an information processing apparatus comprising:

an execution unit configured to execute, for each of a plurality of pages, both of a first control step for controlling a printing apparatus to print a single page and a second control step, for controlling the printing apparatus with regard to the single page, to be executed after completion of the first control step for the single page, wherein after completion of the first and second control steps for the single page, the execution unit executes both of the first and second control steps for another single page;

an interruption unit configured to interrupt the execution in a case where a predetermined interruption factor occurs during the execution of processing by the execution unit;

an acceptance unit configured to (i) in a case where the first control step is completed for a page of interest and the second control step is not completed for the page of interest as a result of the interruption, accept a selection instruction for instructing whether the first control step or the second control step is to be executed for the page of interest and (ii) in a case where the first control step is not completed for the page of interest as the result of the interruption, accept a selection instruction for instructing that the first control step is to be executed for the page of interest without accepting a selection instruction for instructing that the second control step is to be executed for the page of interest; and a setting unit configured to set, as a start step to be resumed by the execution unit, a control step, corresponding to the selection instruction accepted by the acceptance unit, from among the first control step and the second control step.

* * * * *